United States Patent

[11] 3,599,857

[72] Inventors Calvin D. Loyd
 Peoria;
 Theodore L. Oberle, Washington; Ira H. Sage, Peoria; Ronald L. Satzler, Metamora, all of, Ill.
[21] Appl. No. 819,291
[22] Filed Apr. 25, 1969
[45] Patented Aug. 17, 1971
[73] Assignee Caterpillar Tractor Co.
 Peoria, Ill.

[54] WIDE RANGE FRICTION WELDER
 14 Claims, 11 Drawing Figs.
[52] U.S. Cl. .................................................... 228/2,
 29/470.3, 156/73
[51] Int. Cl. ................................................. B23k 27/00
[50] Field of Search .......................................... 228/2;
 29/47.03; 156/73

[56] References Cited
 UNITED STATES PATENTS

| | | | |
|---|---|---|---|
| 3,516,591 | 6/1970 | Gage ............................ | 228/2 |
| 3,417,457 | 12/1968 | Burke et al. .................. | 29/470.3 |
| 3,388,849 | 6/1968 | Blum et al. ................... | 29/470.3 |
| 3,378,913 | 4/1968 | Cheng .......................... | 29/470.3 |
| 3,337,108 | 8/1967 | Taylor .......................... | 228/2 |
| 3,238,612 | 4/1966 | Herman ........................ | 228/2 |
| 3,235,162 | 2/1966 | Hollander ..................... | 29/470.3 |
| 3,234,646 | 2/1966 | Hollander et al. ............ | 29/470.3 |

Primary Examiner—John F. Campbell
Assistant Examiner—Robert J. Craig
Attorney—Fryer, Tjensvold, Feix, Phillips & Lempio ABSTRACT: A friction welding machine is adapted to weld workpieces having a wide range of diameters by utilizing a unidirectional drive means, such as a one-way overrunning clutch, which is disposed between rotatable components of the machine and a rotatable workpiece holding spindle. The unidirectional drive means provides a driving connection between the rotatable components and the spindle when relative motion therebetween is in one direction and prevents a driving connection when relative motion therebetween is in an opposite direction. One embodiment of the invention has a dual-spindle arrangement in which the spindles may be operated independently or together to provide a machine which is capable of friction welding workpieces having a large range of diameters. The dual-spindle arrangement also permits workpieces of relatively large diameter to be loaded and unloaded from the machine while the input energy components of the machine are being accelerated to welding velocity.

Fig. 1

INVENTORS
CALVIN D. LOYD
THEODORE L. OBERLE
IRA H. SAGE
RONALD L. SATZLER

WIDE RANGE FRICTION WELDER

BACKGROUND OF THE INVENTION

This invention relates to friction welding of the general type wherein two workpieces are subjected to relative rotation while in rubbing contact with each other to generate frictional heat to raise the workpieces to a suitable welding temperature, whereupon the relative rotation subsides and a bond is formed between the workpieces.

It is also to be understood that the invention is applicable to the inertia friction welding process as described in U.S. Pat. No. 3,273,233 and as set forth below.

In the inertia welding process the energy required to bring the common interface of the workpieces to a bondable condition is stored as kinetic energy in rotating inertia weights. These weights generally take the form of flywheels and are connected to one of the workpieces and the entire energy necessary to form the bond is stored in the weights prior to the engagement of the workpieces at the interface. The stored energy is discharged into the interface through frictional heating and plastic working developed at the interface as the rubbing contact slows the rotating weights and the bonding cycle is concluded.

More specifically, the present invention is directed to a wide range friction welding system which provides reliability and versatility whereby a wide variety of workpiece sizes may be welded with a minimal amount of downtime between welding operations.

One of the principal objects of the present invention is the provision of a welding machine which has a unidirectional drive means, such as a one-way overrunning clutch, disposed between rotatable drive components of the machine and a rotatable workpiece holding spindle to permit the welding of workpieces having a wide range of diameter sizes.

Another principal of the present invention is the provision of a friction welding machine having a dual-spindle arrangement in which the spindles may be operated independently or together to provide for the friction welding of workpieces having a large range of diameters.

Another object of the invention is the provision of a dual-spindle arrangement whereby workpieces may be loaded or unloaded from the machine while the input energy components of the machine are being accelerated for a succeeding welding operation.

A further object of the invention is the provision of a dual spindle arrangement and a selectively operable dual-flywheel arrangement whereby either a small or large amount of input energy may be supplied for the friction welding of a wide range of workpiece sizes.

Still another object of the invention is the provision of a dual-spindle arrangement wherein the drive means for one of the spindles is provided with a one-way overrunning clutch which clutch functions to connect or disconnect a drive motor to the spindle depending upon the speed and rotational direction of the drive motor.

Yet another object of the invention is the provision of a dual spindle friction welder in combination with a one-way overrunning clutch and a pair of selectively operable coupling elements to provide inter alia for the following drive arrangements:

independent rotation of either spindle;

maintaining one spindle stationary for loading and unloading of weld pieces while the other spindle is being accelerated for a subsequent welding operation;

coupling the two spindles directly to each other to utilize the combined energy stored in inertia components on either one or both spindles for a friction welding operation; and utilizing only the energy of the workpiece spindle by causing the workpiece spindle to rotate in a direction opposite the normal driving direction whereby the one-way clutch permits the outer spindle to remain at rest.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENT

Figure 1:
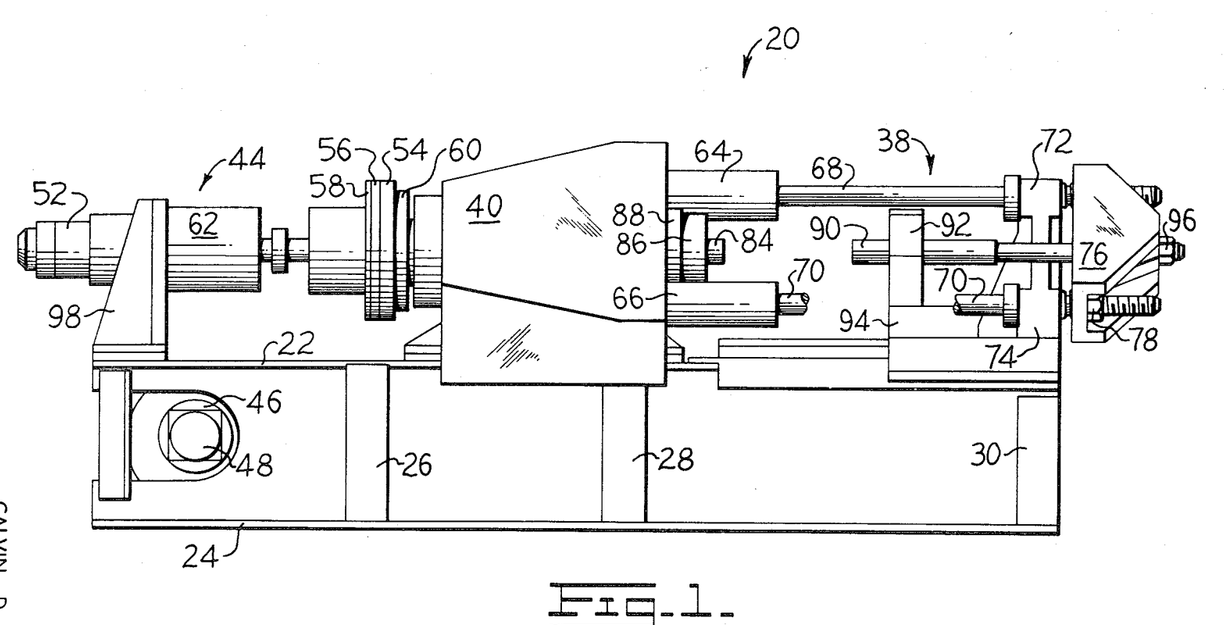
FIG. 1 is a side elevational view illustrating one exemplary embodiment of a friction welding machine constructed in accordance to the present invention.

Referring to FIG. 1, a preferred embodiment of the invention comprises a frictional welding machine 20 having a base or support assembly comprised of horizontal plates 22 and 24. The base assembly further comprises angle supports 26, 28 and 30 which cooperate with the horizontal plates 22 and 24 and two I-beams 32 and 34 (see FIGS. 3 and 4) to provide a very rigid structure for supporting the various machine components. Mounted on the support structure just described are tailstock assembly 38, a spindle housing assembly 40 and a hydrostatic transmission and drive assembly 44.

An electric motor 46 drives two hydraulic pumps 48 and 50 and the pump 50 powers a hydrostatic motor 52. The pump 48 is utilized to power a hydraulic ram assembly as will be described in greater detail at a later point in the description. As further shown in FIG. 1 a plurality of flywheels 54, 56 and 58 may be selectively connected to a flywheel hub 60 for use in a given welding operation. The number of flywheels which are connected to the flywheel hub 60 would of course depend upon the size of the workpieces which are to be joined by the friction welding operation. Those flywheels which are not required for a given welding operation may be stored on a housing 62.

The spindle housing 40 is provided with dual hydraulic rams 64 and 66 which are powered by the pump 48 and have piston rods 68 and 70 which extend through guide sleeves 72 and 74 provided on the tailstock assembly 38. The outermost ends of the piston rods 68 and 70 are attached to a tailstock bracket 76 by means of suitable nuts 78 and 80. The hydraulic rams 64 and 66 may be actuated to move the tailstock assembly 38 horizontally toward and away from the spindle housing 40. The hydraulic rams also serve to provide the necessary axial thrust or pressure required during a friction welding operation.

As also shown in FIG. 1 a workpiece 84 is firmly clamped in a rotatable chuck or fixture 86 which chuck is fastened to a workpiece spindle 88. As will be described in greater detail at a later point in the description, one or more flywheels 89 (see FIG. 2) may also be attached to the spindle 88 depending upon the size of the workpieces being welded. A second workpiece 90 is clamped in a split fixture 92 which ensures that the second workpiece 90 will not rotate during a welding operation. The fixture 92 is fastened to the tailstock base 94. It should be understood that the tailstock fixture 92 could be a nonrotatable chuck or any other suitable type of fixture which will hold the workpiece 90 against rotation. The fixture 92 also has means (not shown) for vertical and horizontal adjustment. In addition, a backup member 96 is fastened to and passes through the bracket 76 to backup the workpiece 90. The backup member 96 is also adjustable to accommodate workpieces of various length.

Figure 3:
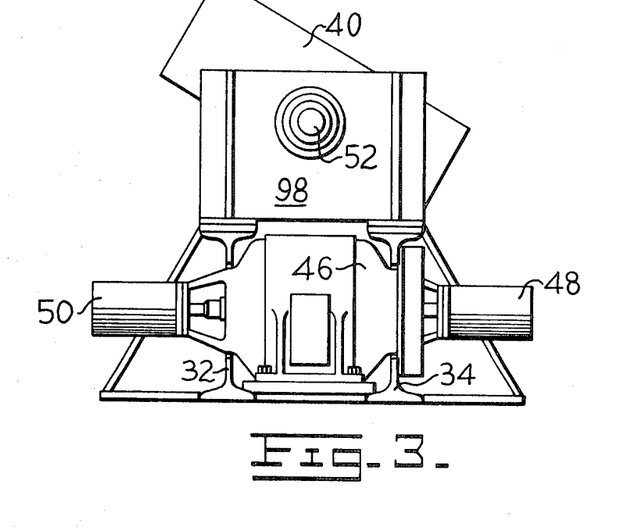
FIG. 3 is an end view taken at the front end of the machine.
Figure 4:
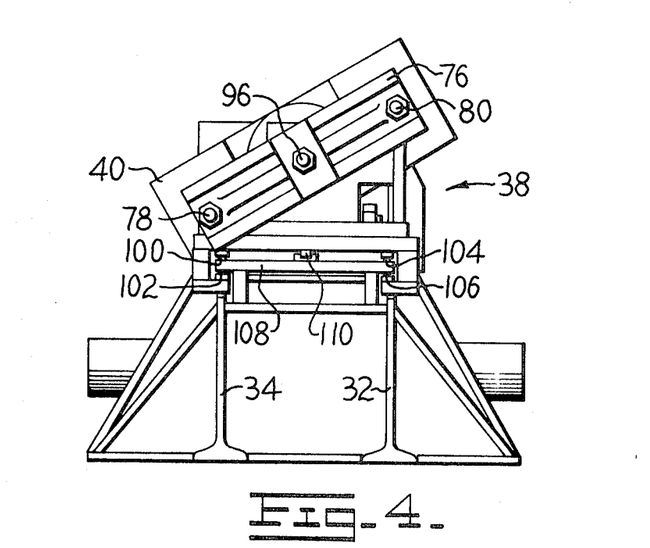
FIG. 4 is an end view taken at the back end of the machine.

FIGS. 3 and 4 are end views taken from each end of the machine and illustrate how the spindle housing 40 and the tailstock assembly 38, including the bracket 76, are positioned at an angle of approximately 30° to the horizontal base of the machine. This angled position of the tailstock assembly 38 and the spindle housing 40 provides easier loading and unloading of the machine.

It may also be observed from FIG. 3 that the hydraulic pumps 48 and 50 are connected directly to the output shaft of the electric motor 46. The hydraulic pump 48 is provided with suitable hydraulic connections (not shown) for connecting the pump to the hydraulic rams 64 and 66. In addition, the hydrostatic motor 52 and the housing 62 are fastened to and supported by a bracket assembly 98.

FIG. 4 illustrates the tailstock end of the machine. As shown in FIG. 4, four sets of linear motion roller bearings 100, 102, 104 and 106 support the tailstock assembly 38 and provide means for relatively frictionless movement of the tailstock assembly in a horizontal direction. These bearings are in contact with and travel along machined ways of a plate 108. A guide tongue 110 travels in a machined slot to help guide the tailstock assembly as it moves forwardly or backwardly.

Figure 2:
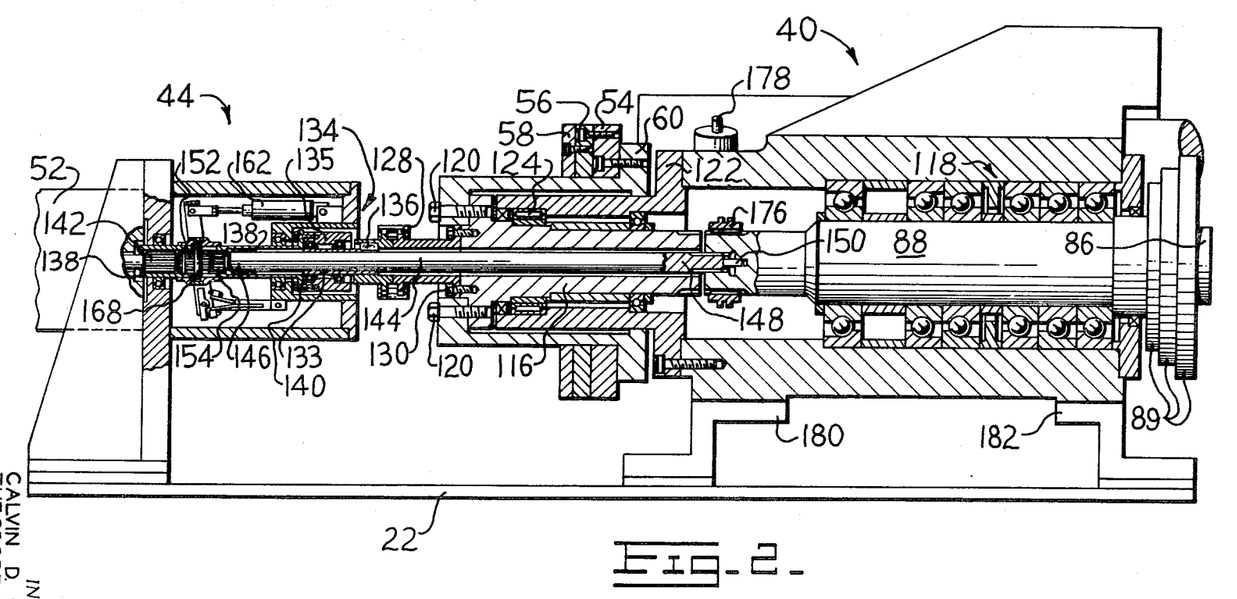
FIG. 2 is a longitudinal view, partially in section, illustrating certain details of the dual spindle and flywheel arrangement of the machine illustrated in FIG. 1.

FIG. 2 is a sectional view illustrating the internal components of the spindle assembly 40 and the drive assembly 44. The machine contains two separate spindles; the previously mentioned workpiece spindle 88 and a secondary spindle 116. The reason for the use of two spindles will be explained at a later point in the description with respect to a typical welding operation.

A thrust bearing assembly 118 is also shown and is essentially comprised of several individual angular contact ball bearings which are matched and assembled to form one bearing. The thrust being is provided to absorb axial thrust produced during a friction welding operation.

The secondary spindle 116 is fastened to the flywheel hub 60 by means of cap screws 120. A bearing housing 122 is provided with spindle bearing elements 124 which support the secondary spindle 116 for rotation within the housing. The secondary spindle 116 is also fastened to a coupling 128 by means of cap screws 130.

Figure 5:
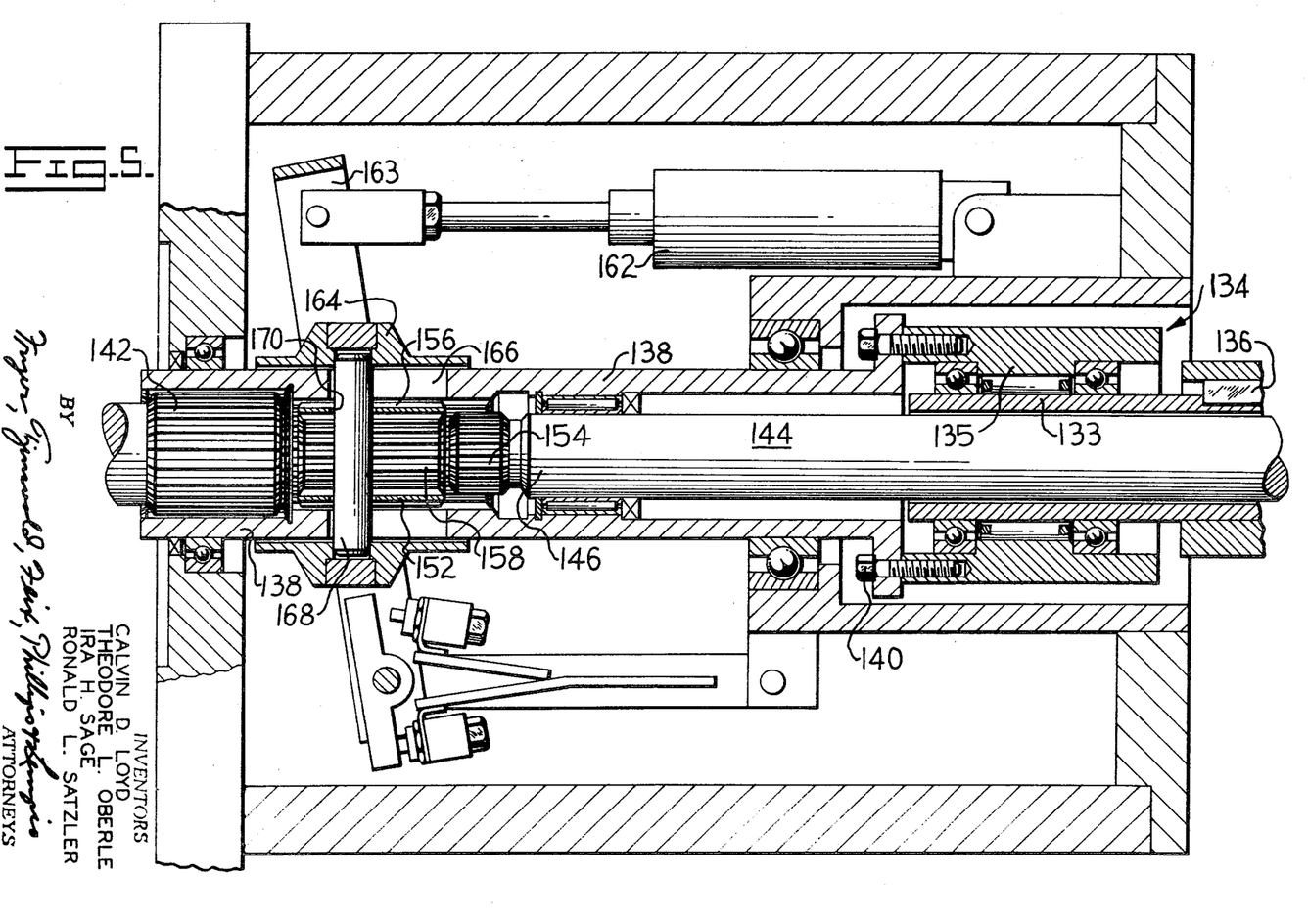
FIG. 5 is a longitudinal view, partially in section, illustrating certain structural details of the driving components for the dual spindles arrangement of the present invention.

The coupling 128 is connected to the inner race 133 of a one-way sprag clutch 134 by means of a key 136 (see FIG. 5). The outer race 135 of the one-way clutch 134 is fastened to a hollow drive shaft 138 by means of cap screws 140. The hydrostatic motor 52 is connected at all times to the drive shaft 138 by means of a splined shaft 142.

A spindle shaft 144 has a first end 146 located near the end of the hydrostatic motor shaft 142. The spindle shaft 144 extends through the one-way clutch 134 and the secondary spindle 116 where the second end 148 of the shaft is connected to the workpiece spindle 88 by means of a splined or other suitable connection as shown at 150.

As best shown in FIG. 5 a movable coupling 152 is situated between the hydrostatic motor shaft 142 and a splined end 154 located at the first end 146 of the spindle shaft 144. The coupling 152 is connected to the drive shaft 138 by external splines 156 and may also be connected to the splined end 154 of the spindle shaft 144 by means of internal splines 158. This latter connection between the splined end 154 of the spindle shaft 144 and the internal splines 158 of the coupling 152 occurs when the coupling is shifted to the right.

Thus, there exists a condition when the coupling 152 is connected to both the spindle shaft 144 and the main drive shaft 138 which drive shaft is always connected to the hydrostatic motor 52. The lateral shifting of the coupling 152 may be accomplished through means of a hydraulic or air shift assembly 162 which actuates a lever 163 to move a sleeve 164 which sleeve is connected to the coupling 152 by a pin 168. The drive shaft 138 is provided with slots 166 which allow the pin 168 which is received in a bore 170 in the coupling 152 to shift the coupling laterally into engagement with the splined end 154 of the spindle shaft 144.

By utilizing coupling 152 and the properties of the one-way clutch 134, the workpiece spindle 88 can be driven in a direction opposite to the normal driving direction without causing the secondary spindle 116 and the related flywheels 54, 56 and 58 to rotate. Advantage of this arrangement will be explained in the weld sequence description set forth at a later point in the description. In addition, another sleeve type coupling 176 (see FIG. 2) is provided for connecting the secondary spindle 116 to the workpiece spindle 88. Shifting of the coupling 176 is accomplished through the use of a hydraulically or air operated shift assembly, part of which is shown at 178. The entire spindle assembly 40 is fastened to and supported by mounting brackets 180 and 182 which are fastened to the base plate 22.

FIGS. 6—10 illustrate in diagrammatic form various phases of operation of the friction welding machine of the present invention. In FIGS. 6—10 reference numerals have been used which correspond to those reference numerals depicted in FIGS. 1—5. In addition, a power drive line 190 is represented in FIGS. 6—10 by heavy dark lines having arrows.

Figures 6, 7, 8, 9, 10:
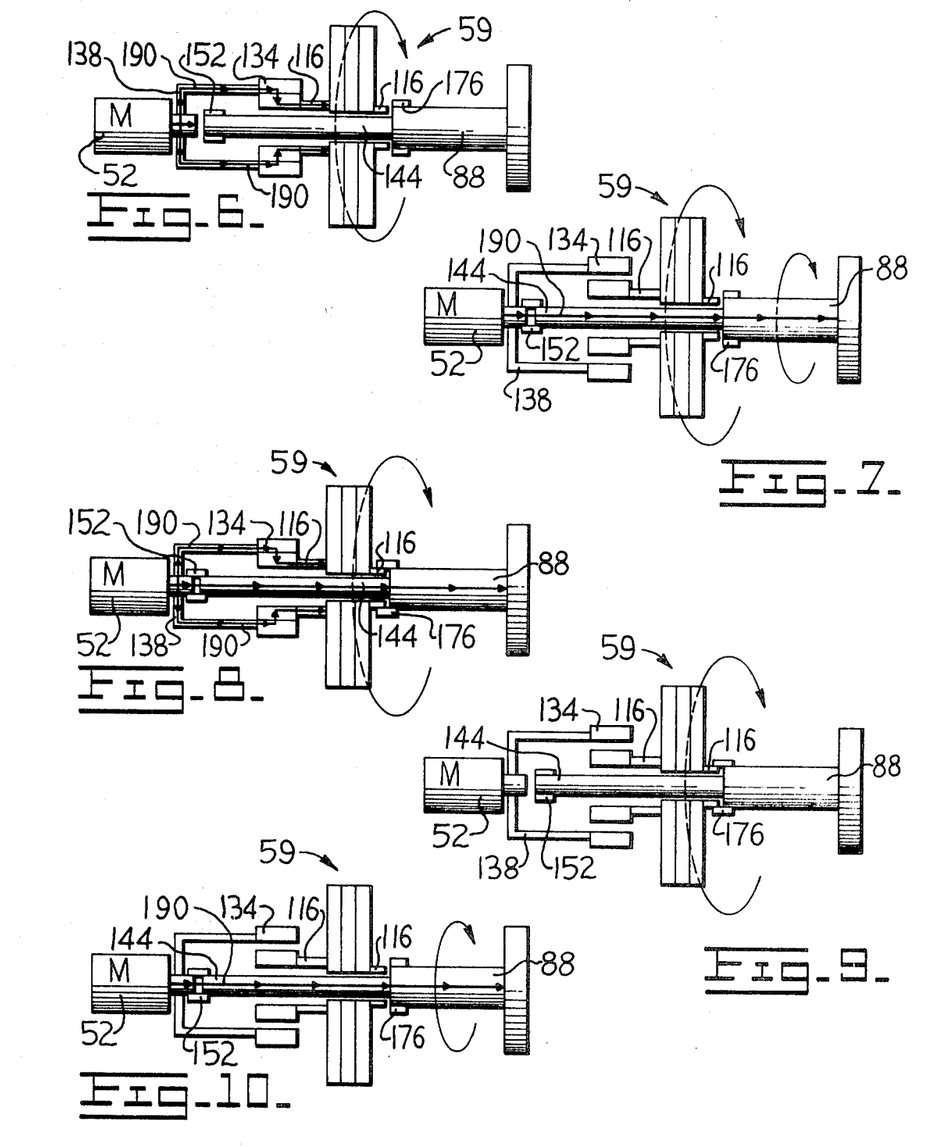
FIGS. 6—10 are diagrammatic view illustrating the power drive line through the machine during various phases of a friction welding operation; and, FIG. 11 is a longitudinal view, partially in section, of a modified embodiment of the invention.

Referring to FIG. 6, the motor 52 is shown turning the flywheels, shown generally at 59, by means of the power drive 190 which drives through the main drive shaft 138, the one-way overrunning clutch 134 and the secondary spindle 116. In FIG. 6 the coupling 152 and the coupling 176 are not activated and consequently the workpiece spindle 88 does not rotate.

In FIG. 7, the motor 52 has been shut down and the flywheels 59 have in effect been disconnected from the motor since the overrunning clutch 134 permits the flywheels to continue rotating even though the motor is stopped. After the motor is stopped the coupling 152 is activated to connect the workpiece spindle 88 to the motor 52 via spindle shaft 144. The workpiece spindle 88 is then accelerated by the motor and during this time the secondary spindle 116 and associated flywheels 59 continue to freewheel or coast.

Referring to FIG. 8 the workpiece spindle 88 has been accelerated by the motor 52 and as the spindle 88 reaches the same speed as the freewheeling secondary spindle 116 and flywheels 59, the motor 52 will begin driving the secondary spindle 116 by means of the overrunning clutch 152. In addition, the motor 52 continues to drive the workpiece spindle 88 via shaft 144. Thus, in the condition shown in FIG. 8 both the workpiece spindle 88 and the secondary spindle 116, having the flywheels 59 connected thereto, are rotating at the same speed. At this stage in the operation the coupling 176 may be activated to directly connect the flywheel spindle 116 and associated flywheels 59 to the workpiece spindle 88. The motor 52 is then accelerated to bring the coupled spindles up to the desired welding speed.

FIG. 9 illustrates the condition of the welding machine after the welding speed has been reached. After the welding speed has been attained, the coupling 152 is disconnected from the motor 52 and the motor may be stopped. Stopping of the motor 52 is effect disconnects the motor from the spindle 116 since the one-way clutch 134 is in an overrunning condition. At this stage in the operation, the coupled assembly of the secondary spindle 116 and the workpiece spindle 88 are in freewheeling or coasting condition at the desired welding speed and a friction weld may be made by moving the tailstock assembly having the workpiece 90 into contact with the rapidly rotating workpiece 84.

FIG. 10 illustrates a different mode of operating the friction welding machine of the present invention. In FIG. 10 the coupling 152 has been activated to connect the motor 52 to the workpiece spindle 88. However, the motor 52 is powered in a reverse direction as compared to FIGS. 6—9 which of course turns the workpiece spindle 88 in a reverse direction. Since the clutch 134 is a one-way clutch, it will not drive the flywheel spindle 116 when the motor 52 is powered in a reverse direction and therefore the flywheels 59 remain stationary. Consequently, the workpiece spindle 88 may be utilized, with or without flywheels, such as shown at 89 in FIG. 2. This aspect of the machine operation permits the welding of small diameter workpieces since the inertia mass associated with the flywheel spindle 116 is not transmitted through the power drive line 190. It is also possible to achieve the operating method shown in FIG. 10 by disconnecting the coupling 128 rather than by turning the workpiece spindle 88 in a reverse direction. Disconnecting the coupling 128 prevents rotary motion from being imparted to flywheel spindle 116 which should not rotate when operating the machine in the manner depicted in FIG. 10.

A typical welding sequence for welding two parts of considerable diameter or area would be conducted as follows. After calculation of the required amount of input energy needed, flywheels (such as the flywheels 54, 56 and 58) having the correct size are attached to the flywheel hub 60. The hydrostatic motor 52 is then accelerated by means of the electric motor 46 and the hydrostatic pump 50.

The motor 52 turns the drive shaft 138 which drives the one-way overrunning clutch 134 which, in turn drives the secondary spindle 116 and the attached flywheels. The workpiece spindle 88 has remained at rest during this time since neither the coupling 152 nor the coupling 176 has been activated and consequently the spindle shaft 144 is not turning. Thus, while the secondary spindle 116 and the flywheels associated therewith are being accelerated the workpieces 84 and 90 may be loaded and clamped into their respective workpiece holders.

After the secondary spindle 116 attains a preselected velocity, the hydrostatic motor 52 is signalled to stop. However, the secondary spindle 116 and the associated flywheels 54, 56 and 58 continue to coast or freewheel through the overrunning feature of the one-way clutch 134.

After the motor 52 has been stopped, the coupling 152 is engaged by means of the hydraulic shifter assembly 162 which directly connects the workpiece spindle 88 to the motor by means of the spindle shaft 144. The motor 52 is again accelerated and at the moment when the speed of the workpiece spindle 88 attains the speed of the freewheeling secondary spindle 116 the one-way clutch again begins to drive the secondary spindle 116.

Both the workpiece spindle 88 and the secondary spindle 116 are now being driven by the motor 52 and hence their velocity is identical. Since their velocity is the same, the coupling 176 may be activated by the shifter assembly partially shown at 178 to directly connect the secondary spindle 116 to the workpiece spindle 88. At this time the hydrostatic motor accelerates both spindles to a preselected welding velocity.

Once the welding velocity is reached the coupling 152 is disengaged and the hydrostatic motor is signalled to stop. As the speed of the hydrostatic motor falls off to zero the overrunning feature of the one-way clutch 134 in effect disconnects the flywheel spindle 116 from the motor. At this time the entire coupled assembly is freely rotating at the desired welding speed and the dual hydraulic rams 64 and 66 are activated to move the tailstock assembly 38 toward the spindle housing 40 and the workpieces 84 and 90 are forced into rubbing contact under the desired axial thrust or pressure. As the workpieces are forced into contact at their common interface frictional heat is generated which raises the workpiece interface to a suitable bonding temperature whereupon the relative rotation subsides as the workpieces become bonded to each other.

At the end of the weld cycle the coupling 176 is disengaged and the hydraulic rams 64 and 66 are actuated to move the tailstock assembly 38 into the preweld condition. The welded assembly may now be removed from the machine and the weld cycle may be repeated. It should be understood that the secondary spindle 116 and associated flywheels may be accelerated in preparation for another welding operation immediately after the coupling 176 is disconnected.

The provision of the dual-spindle arrangement permits a decided advantage in that the secondary spindle 116 and associated flywheels may be accelerated while the workpiece spindle 88 remains at rest. In this manner the workpieces 84 and 90 may be loaded or unloaded while the large inertia mass associated with the secondary spindle 116 is being accelerated to the desired high speed. This is a particularly advantageous feature when welding operations are being performed on workpieces having large diameters and therefore requiring a high-input energy factor.

At the same time the dual spindle system incorporated in the instant machine permits the welding of the workpieces having rather small diameters since it is possible to utilize only that energy which is generated through rotation of the workpiece spindle 88. As previously pointed out, this latter mode of operation is accomplished by engaging the coupling 152 and accelerating the hydrostatic motor 52 in a direction opposite to the normal driving direction. Under these circumstances the one-way clutch 134 freewheels and the flywheel spindle 116 remains stationary as the workpiece spindle 88 is accelerated to the preselected velocity. After the preselected velocity is attained the coupling 152 is disconnected and the rams 64 and 66 are attached to bring the tailstock workpiece 90 into engagement with the rapidly rotating workpiece 84 associated with the freewheeling workpiece spindle 88.

The dual-spindle arrangement makes it convenient to alternately weld both large and small parts because when welding smaller parts the flywheels 54, 56 and 58 do not have to be removed from the hub 60 of the secondary spindle 116 since the spindle 116 does not rotate when the motor rotates in a direction opposite the regular driving direction.

As previously noted the machine of the present invention has also been provided with a dual-flywheel arrangement. That is, in addition to the flywheels 54, 56 and 58 associated with the secondary spindle 116 one or more flywheels, such as shown at 89, may also be attached to the workpiece spindle 88. This feature of the machine makes it possible to bridge the gap of energies available from rotating the workpiece spindle 88 alone as compared with rotation of the workpiece spindle 88 when coupled with the secondary spindle 116 and the inertia mass associated therewith. Even with no flywheels attached to the hub 60 the energy provided by rotation of the secondary spindle 116 is quite large and would result in too much energy for the successful friction welding of intermediate sized workpieces. However, since flywheels may be attached to the workpiece spindle 88 the necessary energy for welding intermediate sized workpieces can be provided by the machine.

Figure 11:
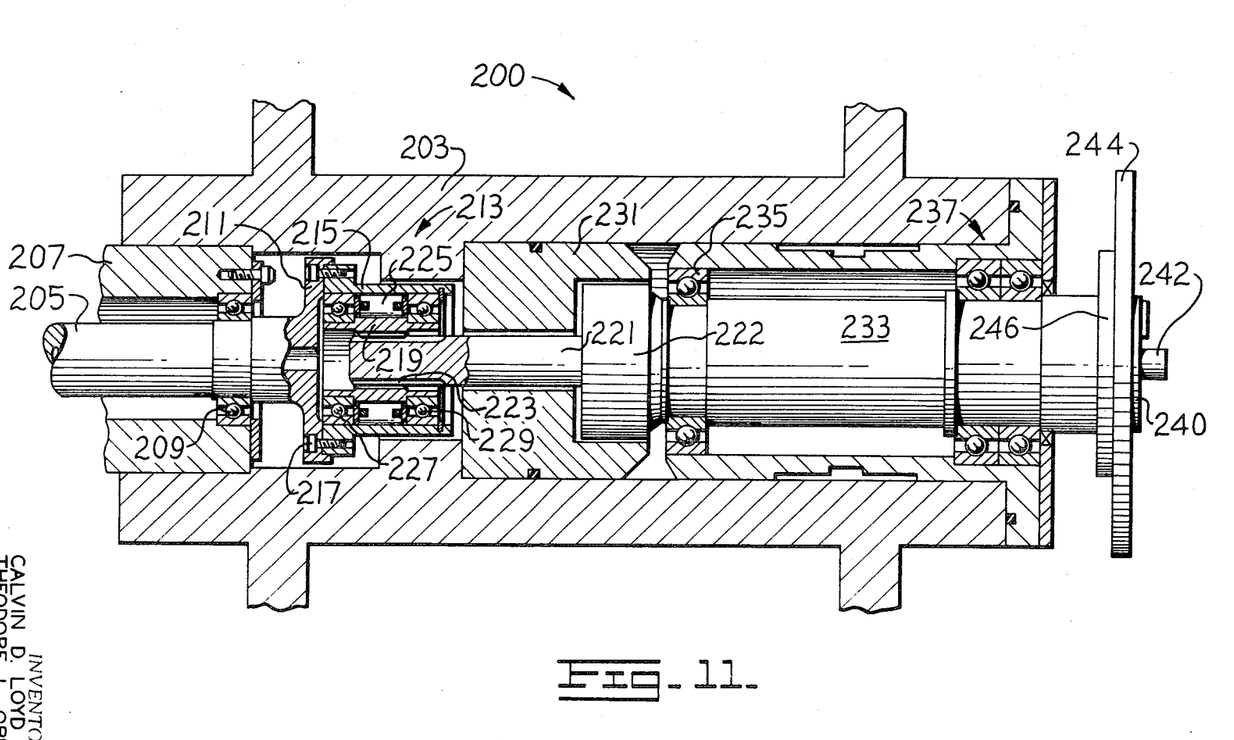

FIG. 11 illustrates another embodiment of the invention wherein a unidirectional drive means, such as a one-way overrunning clutch, is utilized to provide for the welding of a wide range of workpiece diameters. In FIG. 11, a friction welding machine spindle assembly is generally shown at 200. The spindle assembly 200 comprises a spindle housing 203 which contains a power drive shaft 205, a unidirectional drive assembly generally shown at 213 and a main workpiece holding spindle 233.

The power drive shaft 205 is supported for rotation within a drive shaft housing 207. A suitable bearing assembly 209 supports the drive shaft 205 for rotation within the drive shaft housing 207. Although not shown, the power shaft 205 is connected to a transmission and motor means which impart rotation to the drive shaft during a welding operation. A flange element 211 is formed on one end of the power drive shaft 205.

An outside race 215 of the one-way overrunning clutch assembly 213 is fastened to the flange 211 by means of suitable bolts 217 or the like. The one-way overrunning clutch 213 is preferably a sprag clutch and has an inner race 219 which is connected to a clutch output shaft 221 by means of a splined connection 223.

Sprag elements 225 are located between the outer race 215 and the inner race 219 in a manner such that when the outer race is rotated in one direction the sprag elements 225 will wedge between the inner and outer races and impart rotation from the outer race to the inner race. Conversely, when the outer race 215 is rotated in the opposite direction the sprag elements 225 do not wedge between the inner and outer races and there is no driving connection between the outer race to the inner race. Two ball bearing assemblies 227 and 229 are positioned between the outer race 215 and inner race 219 to provide for relative rotation between the inner and outer race elements when the clutch 213 overruns.

The clutch output shaft 221 extends through a hydrostatic bearing thrust block 231 and is fastened to the main workpiece spindle 233 by means of cap screws (not shown) which extend through the flanged portion 222 of the clutch output shaft 221. Bearing assemblies 235 and 237 support the main workpiece spindle 233 for rotation within the housing 203. The outer end of the workpiece spindle 233 is provided with a workpiece holding chuck 240 which has gripping means for firmly holding a workpiece 242. One or more flywheels such as shown at 244 and 246 may be attached to the chuck 240 depending upon the size of the workpieces being welded.

During a welding operation the power drive shaft 205 is rotated by the motor and transmission (not shown). The power drive shaft 205 in turn rotates the outer race 215 of the one-way overrunning clutch 213. The outer race 215 imparts rotation to the inner race 219 of the clutch by means of the sprag element 225. Since the inner race 219 of the clutch is splined to the clutch output shaft 221 the clutch output shaft also rotates and causes rotation of the main workpiece holding spindle 233.

After the main spindle 233 has been rotated to a predetermined velocity the motor means is stopped which thereby stops rotation of the power drive shaft 205 and the outer race 215 of the clutch assembly 213. The sprag elements 225 will then release and the inner race 219 of the clutch will overrun or continue to rotate as will the clutch output shaft 221 and the main spindle 233. The weld can then be made without the motor, transmission, power drive shaft 205 and outer clutch race 215 adding energy to the welding mass. In other words, because of the one-way overrunning clutch 213 is located relatively close to the rotatable workpiece 242 it is possible to weld small workpieces because the inertia or rotating mass of most of the drive line components may be disconnected from the workpiece spindle during the actual welding operation. On the other hand, relatively large workpieces may also be welded on the machine embodiment shown in FIG. 11 since a considerable amount of flywheel mass may be attached to the chuck 240.

In general, the embodiment of the invention shown in FIG. 11 differs from the previously described dual spindle arrangement in that it may be used to weld a wide range of workpiece diameters including quite small workpieces which require very little inertia mass.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a friction welding machine for joining a first workpiece to a second workpiece by means of relatively rotating the workpieces and forcing them into contact at a common interface to generate frictional heat to raise the workpieces to a suitable bonding temperature whereupon the relative rotation subsides and the workpieces become bonded to each other, the improvement comprising: a motor; a drive shaft connected to the motor; a first spindle connected to the drive shaft by means of a one-way overrunning clutch; said one-way clutch having a connection with the drive shaft so that rotation of the drive shaft in a first direction produces rotation of the first spindle while rotation of the drive shaft in a second direction has no effect on the first spindle; means for operatively connecting inertia mass to the first spindle;
   a second spindle having workpiece holding means associated therewith; and
   first coupling means operable to selectively couple the second spindle to the drive shaft so that the second spindle may be rotated in one direction without effecting rotation of the first spindle.

2. A friction welding machine as set forth in claim 1 and further comprising second coupling means operable to selectively couple the first spindle to the second spindle.

3. A friction welding machine as set forth in claim 1 wherein the second spindle has means for operatively connecting inertia mass thereto.

4. A friction welding machine as set forth in claim 2 wherein the second spindle has means for operatively connecting inertia mass thereto.

5. A friction welding machine as set forth in claim 1 wherein the first spindle and the second spindle are axially aligned and a portion of the first coupling means extends through the first spindle and is mounted for relative rotation with respect to the first spindle.

6. A friction welding machine as set forth in claim 5 and further comprising second coupling means operable to selectively couple the first spindle to the second spindle.

7. A friction welding machine as set forth in claim 5 wherein the second spindle has means for operatively connecting inertia mass thereto.

8. A friction welding machine as set forth in claim 6 wherein the second spindle has means for operatively connecting inertia mass thereto.

9. A method of friction welding a first workpiece to a second workpiece comprising placing a first workpiece in a workpiece holder associated with a first rotatable spindle; placing a second workpiece in a nonrotatable workpiece holding device; rotating a second spindle having a relatively large inertia mass associated therewith to a predetermined speed; rotating the first spindle having the first workpiece held thereon until the first spindle attains the speed of the second spindle; interconnecting the first and second spindles after the first spindle attains the speed of the second spindle so that they rotate together; and, forcing the workpieces together to produce frictional heat at their common interface until a friction welded bond is formed as the energy is expended from the inertia mass and the relative rotation ceases.

10. In a friction welding machine for joining a first workpiece to a second workpiece by means of relatively rotating the workpieces and forcing them into contact at a common interface to generate frictional heat to raise the workpieces to a suitable bonding temperature whereupon the relative rotation subsides and the workpieces become bonded to each other, the improvement comprising:
   a drive motor;
   a rotary spindle having workpiece holding means associated therewith;
   rotatable means located between the drive motor and the rotary spindle;
   unidirectional drive means disposed between the rotatable means and the rotary spindle;
   said unidirectional drive means operable for relative driving connection between the rotatable means and the rotary spindle when the relative motion therebetween is in one direction; and,
   said unidirectional drive means further operable to prevent relative driving connection between the rotatable means and the rotary spindle when the relative motion therebetween is in an opposite direction.

11. A friction welding machine as set forth in claim 10 wherein said unidirectional drive means comprises a one-way overrunning clutch.

12. A friction welding machine as set forth in claim 11 and further comprising means for operably connecting inertia mass to the rotary spindle.

13. A friction welding machine as set forth in claim 11 and further comprising means for operatively connecting inertia mass to the rotary spindle.

14. A friction welding machine as set forth in claim 13 wherein the one-way overrunning clutch is disposed adjacent to the rotary spindle to minimize the inertia components of the drive train during a welding operation.